(12) United States Patent
Kamaal

(10) Patent No.: US 11,301,837 B2
(45) Date of Patent: Apr. 12, 2022

(54) SINGLE PAYMENT DEVICE FOR MULTIPLE PAYMENT ACCOUNTS

(71) Applicant: VISA INTERNATIONAL SERVICE ASSOCIATION, San Francisco, CA (US)

(72) Inventor: Danish Kamaal, Highlands Ranch, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 468 days.

(21) Appl. No.: 16/332,612

(22) PCT Filed: Sep. 12, 2016

(86) PCT No.: PCT/US2016/051296
§ 371 (c)(1),
(2) Date: Mar. 12, 2019

(87) PCT Pub. No.: WO2018/048440
PCT Pub. Date: Mar. 15, 2018

(65) Prior Publication Data
US 2021/0279719 A1   Sep. 9, 2021

(51) Int. Cl.
*G06Q 20/34*   (2012.01)
(52) U.S. Cl.
CPC ....... *G06Q 20/3572* (2013.01); *G06Q 20/355* (2013.01)
(58) Field of Classification Search
CPC .......................... G06Q 20/3572; G06Q 20/355
USPC .......................................................... 705/41
See application file for complete search history.

(56) References Cited

U.S. PATENT DOCUMENTS

| 2,003,111 A | 5/1935 | Fischer |
| 2,008,021 A | 7/1935 | Kenety |
| 2,009,173 A | 7/1935 | Gams |
| 2,010,211 A | 8/1935 | Wood |
| 2,013,161 A | 9/1935 | Lombardi |

(Continued)

FOREIGN PATENT DOCUMENTS

| IN | 10201604850 | * | 6/2016 | |
| SG | 10201604850P A | * | 1/2018 | |
| WO | WO-2014145682 A2 | * | 9/2014 | ......... G06Q 20/3552 |

OTHER PUBLICATIONS

"Data processing aspects of the integrated circuit and magnetic stripe cards," by M.S. Madan and M.A. Reid. Information & Management. vol. 22, Issue 1. Jan. 1992. Abstract only. (Year: 1992).*

(Continued)

*Primary Examiner* — Sara C Hamilton
(74) *Attorney, Agent, or Firm* — Loeb & Loeb LLP

(57) ABSTRACT

A payment device including a medium is disclosed. A first programmable chip and a first magnetic stripe are disposed on the medium. The first programmable chip and the first magnetic stripe are associated with a first payment account. A second programmable chip and a second magnetic stripe are disposed on the medium. The second programmable chip and the second magnetic stripe are associated with a second payment account. The first and second programmable chips are programmed separately for each of the first and second payment accounts.

5 Claims, 4 Drawing Sheets

(56) References Cited

U.S. PATENT DOCUMENTS

| | | | |
|---|---|---|---|
| 2,014,224 A | 9/1935 | Campbell | |
| 2,014,239 A | 9/1935 | Ruben | |
| 2,015,006 A | 9/1935 | Ekisler | |
| 2,016,217 A | 10/1935 | Georges | |
| 7,594,611 B1 | 9/2009 | Arrington, III | |
| 2003/0111527 A1 | 6/2003 | Blossom | |
| 2007/0063025 A1* | 3/2007 | Blossom | G06K 19/06206 235/380 |
| 2008/0021824 A1 | 1/2008 | Kranzley | |
| 2009/0173783 A1 | 7/2009 | Fomitchev | |
| 2010/0211504 A1 | 8/2010 | Aabye et al. | |
| 2013/0161390 A1 | 6/2013 | Rodriquez | |
| 2013/0282575 A1* | 10/2013 | Mullen | G06K 7/0004 705/41 |
| 2014/0224883 A1 | 8/2014 | Aiyer et al. | |
| 2014/0239068 A1 | 8/2014 | Park | |
| 2014/0279476 A1* | 9/2014 | Hua | G06Q 20/341 705/41 |
| 2014/0291406 A1* | 10/2014 | Ko | G06Q 20/354 235/492 |
| 2014/0339315 A1* | 11/2014 | Ko | G06Q 20/3227 235/492 |
| 2015/0006407 A1 | 1/2015 | Lunn et al. | |
| 2016/0180306 A1* | 6/2016 | Koeppel | G06Q 20/341 705/41 |
| 2016/0217455 A1 | 7/2016 | Hosny et al. | |

OTHER PUBLICATIONS

International Preliminary Report on Patentability for Application No. PCT/US2016/051296, dated Mar. 21, 2019, 7 pages.
International Search Report and Written Opinion for corresponding International Application No. PCT/2016/051296, dated Jan. 6, 2017, 8 pages.
Extended European Search Report for Application No. EP16915892. 0, dated Mar. 30, 2020, 7 pages.

* cited by examiner

SINGLE PAYMENT DEVICE FOR MULTIPLE PAYMENT ACCOUNTS

CROSS-REFERENCE TO RELATED APPLICATIONS

The present application is a National Stage Entry of and claims priority under 35 U.S.C. §§ 365, 371 to International Application No. PCT/US16/51296, filed Sep. 12, 2016, entitled "SINGLE PAYMENT DEVICE FOR MULTIPLE PAYMENT ACCOUNTS", the entire contents of which are incorporated herein.

BACKGROUND

Over the past several decades use of payment cards such as credit and debit cards to make payment transactions has increased significantly. Due to their popularity, it has become common for consumers to hold multiple payment cards in their wallets, purses, or other carry bags. Carrying multiple payment cards may become cumbersome, and often times consumers may only carry those cards that they use most frequently, leaving their other cards at home in order to reduce the size of their wallet or carry bag. Thus, there exists a need for a single card for multiple payment accounts that can be used to make a payment transaction.

In addition, as payment cards expire, card issuers have to provide new cards to their account holders. The process of reissuing payment cards may become very time consuming and expensive for the issuer as new cards need to be physically prepared and rewritten with new card data, and then mailed to the account holder before the account holder's current card expires. In addition, account holders have to receive and activate the new payment card before they can begin using it. Card activation may become a problem for account holders who travel frequently or have recently moved, as the account holder may not receive the card in time to activate it before their current card expires. Although card activation generally requires a brief phone call to a number provided with the newly issued payment card, it may become a tedious activity to activate multiple cards if a user has numerous accounts. Thus, there exists a need for a payment card that contains programmable chips that may be rewritten with new account data so that new cards do not have to be issued upon expiration.

SUMMARY

In a first aspect a payment device is disclosed. The payment device includes a medium and a first programmable chip is disposed on the medium, where the first programmable chip is associated with a first payment account. A second programmable chip is disposed on the medium, where the second programmable chip is associated with a second payment account, and a third programmable chip is disposed on the medium, where the third programmable chip is associated with a third payment account. The first, second, and third programmable chips are programmed independent of each other.

In another aspect a payment device is disclosed. The payment device includes a medium. A first programmable chip and a first magnetic stripe are disposed on the medium. The first programmable chip and the first magnetic stripe are associated with a first payment account. A second programmable chip and a second magnetic stripe are disposed on the medium. The second programmable chip and the second magnetic stripe are associated with a second payment account. The first and second programmable chips are programmed separately for each of the first and second payment accounts.

In a further aspect a payment device is disclosed. The payment device includes a medium and a master programmable chip disposed on the medium. The payment device also includes a first connector disposed on the medium and electronically connected to and in communication with the master programmable chip. The first connector is associated with a first payment account. The payment device includes a second connector disposed on the medium and electronically connected to and in communication with the master programmable chip. The second connector is associated with a second payment account. The master programmable chip contains programmed logic that can be accessed by any of the first and second connectors.

In another aspect, a payment transaction system is disclosed. The payment transaction system includes a reader for reading a payment device, where the reader is associated with a merchant payment account. The payment device has two or more programmable chips disposed on a medium. Each of the programmable chips is associated with a separate user payment account, where one of the programmable chips is selected for use in the payment transaction. The payment transaction system also includes a payment processing network. The payment processing network transmits: a request for payment from the reader to an acquirer associated with the merchant account; an authentication request to an issuer associated with the user payment account selected for the transaction; payment from the user payment account selected for the transaction to the merchant account; and a payment confirmation message to the reader.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. In the figures, like reference numerals designate corresponding parts throughout the different views.

DETAILED DESCRIPTION

Figure 1A:
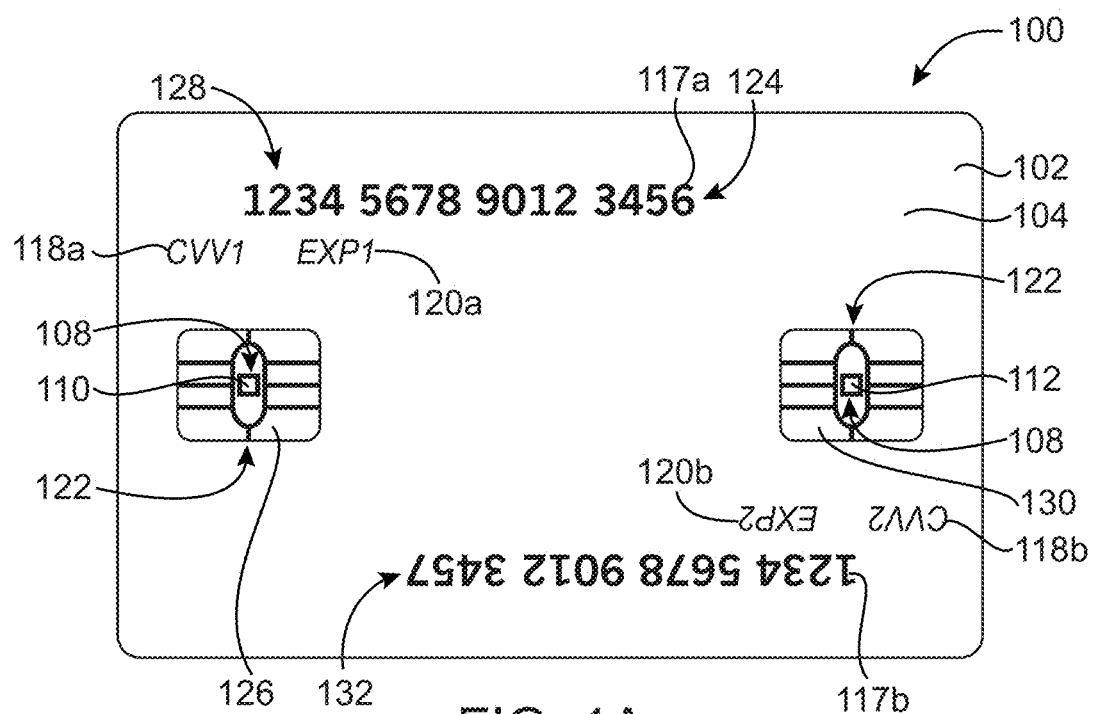
FIG. 1A is a front view of a first embodiment of a payment device.

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

As used herein, the terms first, second, third, and the like are used to distinguish between similar elements and not necessarily for describing a specific sequential or chronological order. The terms are interchangeable under appropriate circumstances and the embodiments of the invention may operate in other sequences than described or illustrated herein.

In addition, the terms top, bottom, front, rear, left, right, upper, lower, and the like as used herein are used for descriptive purposes and not necessarily for describing specific positions. The terms so used are interchangeable under appropriate circumstances and the embodiments described herein may operate in other orientations than described or illustrated herein.

One of the several technical problems addressed by the disclosed device, system and method is how to access several memory sources using a single source for the memories where the memory has to be accessed by a reader that operates according to a known format. The memory may store data that represents a variety of things such as payment account data and the data may be encrypted or securely stored. The memory may be a magnetic stripe, a chip, an radio frequency (RF) communication circuit or a combination thereof. The reader may be a pre-existing device such as a payment card reader.

The embodiments of the methods, devices, and systems disclosed herein relate to a payment device such as a contact or contactless smart card having multiple payment accounts associated therewith. The payment device may enable a user to use a single smart card or traditional magnetic stripe card to make a transaction using any one of the payment accounts associated with the card. The payment device may also include one or more programmable chips which may be re-programmed separately and independent of each other. Therefore, account information, such as the expiration date associated with the programmable chip, can be updated without the need for an issuer to send a new card.

In relation to the present disclosure, it will be appreciated that a payment account refers to any bank account, credit account, bonus reward account, electronic currency account, electronic reward account, deposit account, or checking account. The payment account may be associated with a payment card that is provided by an issuer. The payment card may be a credit card, debit card, gift card, rewards card, and the like. A user may be any entity or person that is making a payment and a merchant may be any entity or person that is receiving payment. A user may use the payment card to transfer money or value from the payment account associated with the payment card to the payment account of another individual or entity. For example, when a payment card is used for a transaction at a merchant, the user provides information contained on the payment card such as the card number, expiration date, card code verification (CVV) number, etc. along with a personal identification number (PIN) or signature in some instances to the merchant at a point of sale (POS) terminal, which may have a scanner, card reader, an RF communication circuit and/or user interface. The merchant, via the POS terminal or other card reader, transmits the card information to an acquirer, which may be a financial institution that processes card payments made to the merchant, and the acquirer transmits an authorization request to the issuer.

The transmission of the request and authorization may take place via a payment network. A payment network may be a system or network used to transfer money or value between payment accounts via the use of cash-substitutes such as payment cards, checks, financial accounts, and the like. The payment network may have restricted access, additional security, and known data formatting rules, and may be a wired network or a wireless network.

A smart card may be any payment card that has embedded integrated circuits. The embedded integrated circuits may be a set of electronic circuits disposed on a small silicon chip. The chip may include: a Read Only Memory (ROM), where instructions are permanently burned into the memory by the manufacturer; Random Access Memory (RAM) or volatile memory, which serves as a temporary storage; and Application Memory such as double Electrically Erasable Programmable Read-Only Memory (E-PROM), which may be erased electronically and rewritten. The chip may be electronically connected to metal-plated contact pads or connectors, which are generally visible as small gold or silver contact pads on the front of the smart card. The connectors may provide electrical connectivity when inserted into a reader. The reader may be used as a communication medium between the smart card and a host such as a computer, POS terminal, automatic teller machine (ATM), or a mobile phone.

Smart cards may be either contact or contactless cards. Contact cards must be physically inserted or "dipped" into a compatible reader for a transaction to be processed. Contactless cards may be read over a short distance using wireless communication such as radio-frequency identification (RFID) technology, Bluetooth, etc. and may be held close to or tapped against a reader, rather than dipped. Smart cards may also include magnetic stripes for use with readers that are not chip-compatible.

EMV is a technical standard for smart cards, payment terminals, and ATM machines. The EMV standard for contact cards is based on the ISO/IEC 7810 and ISO/IEC 7816 series of standards and the EMV standard for contactless cards is based on the ISO/IEC 14443 series of standards. These series of standards define, among other things, the physical shape and characteristics of the smart card, the electrical connector positions and shapes, and communication protocols. Smart cards that comply with the EMV standard are generally referred to as "Chip and PIN" and "Chip and Signature" cards, depending on the authentication method required to complete a transaction. For Chip and PIN cards, a user may be required to dip their smart card into a compatible reader and enter a PIN in order for the transaction to be completed, and for Chip and Signature cards, a user may be required to dip their smart card into a compatible reader and then provide their signature on a display associated with the reader. The placement of the chip and the contacts for the chip may be in locations defined in the appropriate standard and the reader may know to expect contacts for the chip to be in the appropriate locations such that communication may be established between the reader and the chip. Similarly, the magnetic stripe on the smart card may be in predetermined locations defined by the appropriate standard and the reader may know to read the magnetic stripe in those locations.

Figure 1B:
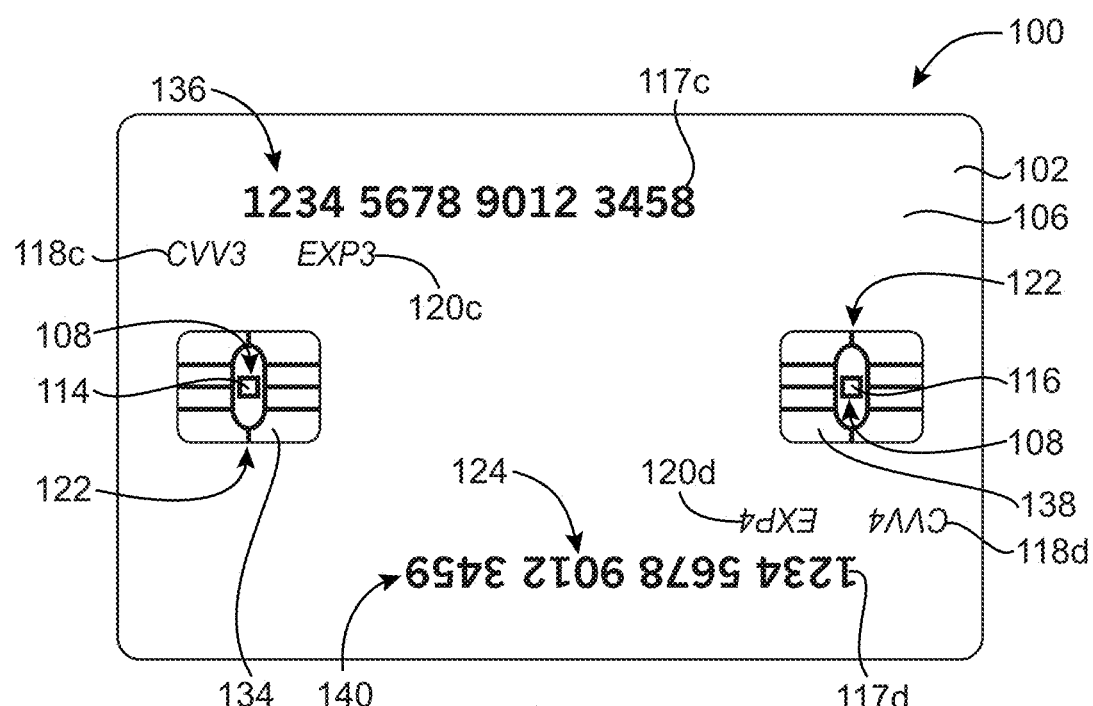
FIG. 1B is a rear view of the payment device of FIG. 1A.

Turning to the figures, FIGS. 1A and 1B illustrate an embodiment of a payment device 100 for making a transaction. The payment device 100 may include a medium 102. The medium 102 may be a physical medium such as a standard plastic debit or credit card, and may have a first side 104 (FIG. 1A) and a second side 106 (FIG. 2B), opposite the first side 104. Alternatively, the medium 102 may be a virtual medium such as a web payment portal.

The medium 102 may include one or more programmable chips 108. For example as shown in FIGS. 1A and 1B, the medium 102 may include a first programmable chip 110, a second programmable chip 112, a third programmable chip 114, and a fourth programmable chip 116. Although four programmable chips 108 are shown in the figures, the medium 102 may include fewer than four programmable chips 108 or more than four programmable chips.

Each of the programmable chips 108 may be an EMV smart chip and may be programmed separately and independently of one another. Further, each of the programmable chips 108 or connectors 122 may have a unique payment account number 117, a CVV 118, and an expiration date 120 associated with it. The CVV 118 and expiration date 120 associated with each of the programmable chips 108 or connectors 122 may be the same or different.

The programmable chips 108 may each be electrically connected to and in communication with one or more connectors 122 disposed on the medium 102. The connectors 122 may enable data stored on the programmable chips 108 to be read by a chip-compatible reader such as a POS terminal or ATM machine. The connectors 122 may also enable each of the programmable chips 108 to be re-programmed with new data by a re-programming device, such as a reader with write capabilities. For example, if one of the programmable chips 108 has an expiration date that is forthcoming, a reader with write capabilities may re-program a new expiration date on the programmable chip via the connector so that the user may continue to use the payment account associated with the programmable chip without any interruption. Similarly, if a payment account associated with a programmable chip is closed, a re-programming device may disable the programmable chip associated with the closed account.

The re-write may occur in a variety of ways. In one embodiment, a trusted device such as an ATM or POS terminal may be used to re-write the data in the programmable chip or magnetic stripe which indicates the new card information. In another embodiment, trusted card readers such as readers at banks or other trusted locations may be used to re-write the data in the programmable chip or magnetic stripe. Finally, in some embodiments, users may have card readers at home with sufficient security steps in place such as a virtual private network (VPN) connection to a trusted source, that the card readers may be used to re-write the chip data or magnetic stripe. Additionally, the data stored in the magnetic stripe and in the programmable chip may be in a known format as defined by a standard.

Each of the programmable chips 108 and the connectors 122 may be associated with a payment account 124, a CVV 118, and an expiration date 120. For example as shown in FIGS. 1A and 1B, the first programmable chip 110 and a first connector 126 may be associated with a first payment account 128, which may have an account number 117a (e.g., the account number ending in "3456"), and may be associated with a CVV 118a and an expiration date 120a. The second programmable chip 112 and a second connector 130 may be associated with a second payment account 132, which may have an account number 117b (e.g., the account ending in "3457"), and may be associated with a CVV 118b and expiration date 120b. The third programmable chip 114 and a third connector 134 may be associated with a third payment account 136, which may have an account number 117c (e.g., the account ending in "3458"), and may be associated with a CVV 118c and an expiration date 120c. And, the fourth programmable chip 116 and a fourth connector 138 may be associated with a fourth payment account 140, which may have an account number 117d (e.g., the account ending in "3459"), and may be associated with a CVV 118d and an expiration date 120d. The payment accounts 124 may be separate and distinct from one another and associated with the same or different financial institutions. Also, as noted above, each of the CVV's 118 and the expiration dates 120 may be the same or different.

As shown in FIGS. 1A and 1B, the first side 104 of the medium 102 may include the first and second programmable chips 110, 112, and the second side 106 of the medium 102 may include the third and fourth programmable chips 114, 116. The arrangement of the chips 108 as well as the payment account number 117, CVV 118, and expiration date 120 as shown in FIGS. 1A and 1B is an illustrative example of one possible arrangement of the chips and additional account information. It may be appreciated that other arrangements of the chips 108 and additional account information are possible and contemplated. For example, the first and third chips 110, 114 being disposed on the first side 106 of the medium and the second and fourth chips 112, 116 being disposed on the second side 106 and vice versa and so on.

Although the medium 102 may take the shape of a standard rectangular payment device, additional shapes may be used to add additional programmable chips and/or magnetic stripes (see FIGS. 2A-3B). For example, the medium may be hexagonal and may store six or more programmable chips representing six or more accounts. Similarly, the card may store less programmable chips and/or magnetic stripes such as where a hexagonal card has five chips.

In another embodiment, one chip may be designated as a "honey pot" chip such that the merchant and payment processor may be promptly notified that the user with the card is using a programmable chip that has been dedicated as fraudulent. For example, if a card is stolen and one chip has been programmed as the "honey pot" chip, if a thief uses the "honey pot" chip, the merchant and processor may be promptly notified that a thief likely has the card.

In yet another embodiment, the medium 102 may have an electronic display. The display may indicate which account is being read by the reader for the current transaction. In one example, the card may have a battery and the battery may activate a processor and a display on the medium. In another embodiment, the display may be activated by the reader and the user may note which account is being used for the present transaction.

Figure 2A:
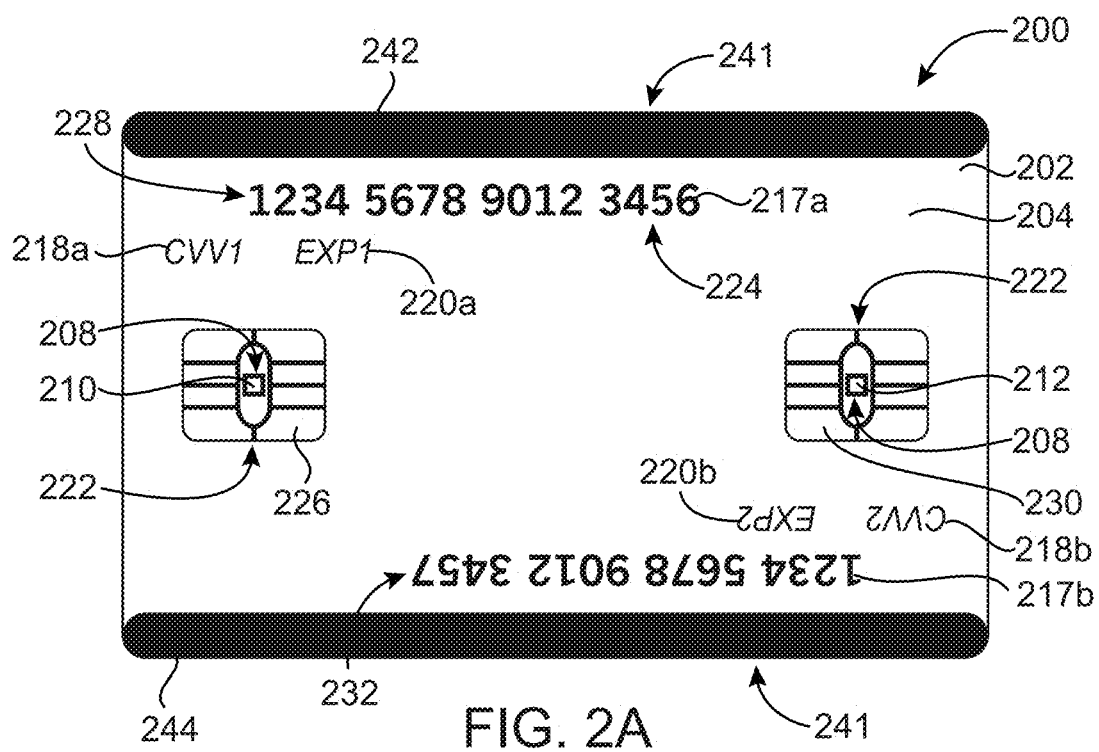
FIG. 2A is a front view of another embodiment of a payment device.
Figure 2B:
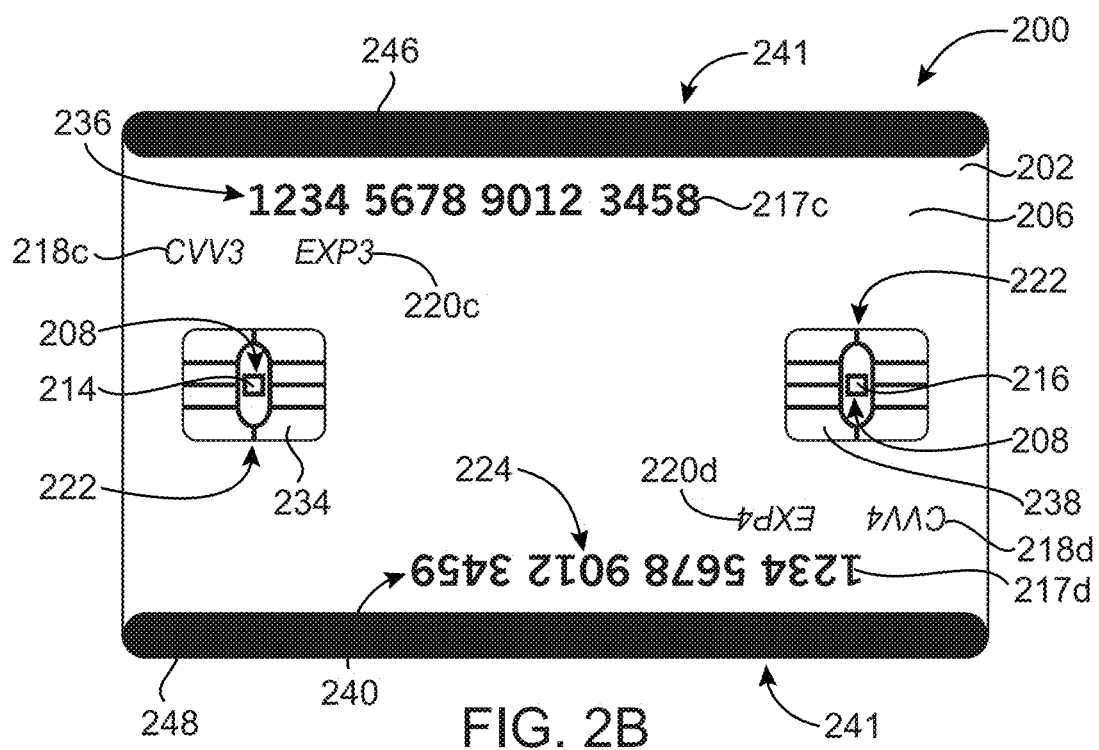
FIG. 2B is a rear view of the payment device of FIG. 2A.

FIGS. 2A and 2B illustrate another embodiment of a payment device 200. The payment device 200 may be substantially similar to the payment device 100 and like components are indicated by similar reference numbers and have similar characteristics and properties as those discussed above. In addition to the programmable chips 208, which may be electronically connected to and in communication with the connectors 222, the payment device 200 may also include one or more magnetic stripes 241. The magnetic stripes 241 may be provided to allow for use of the payment device at a reader that is not chip-compatible. Similar to the programmable chips 208, the magnetic stripes 241 may each be associated with a payment account 224.

As shown in FIGS. 2A and 2B, four programmable chips 210, 212, 214, 216, four connectors 226, 230, 234, 238, and four magnetic stripes 242, 244, 246, 248 may be provided on the payment device 200. For example, the first programmable chip 210, the first connector 226, and the first magnetic stripe 242 may be associated with a first payment account 228, which may have an account number 217a. The second programmable chip 212, the second connector 230, and the second magnetic stripe 244 may be associated with a second payment account 232, which may have an account number 217b. The third programmable chip 214, the third connector 234, and the third magnetic stripe 246 may be associated with a third payment account 236, which may have an account number 217c. And, the fourth programmable chip 216, the fourth connector 238, and the fourth magnetic stripe 248 may be associated with a fourth payment account 240, which may have an account number 217d. In addition, a CVV 218 and an expiration date 220 may be associated with each of the programmable chips 208, connectors 222, magnetic stripes 241, and/or payment accounts 224, where each of the CVV's 218 and expiration dates 220 may be the same or different from one another. Further, each of the programmable chips 208 may be separately and independently programmed.

Figure 3A:
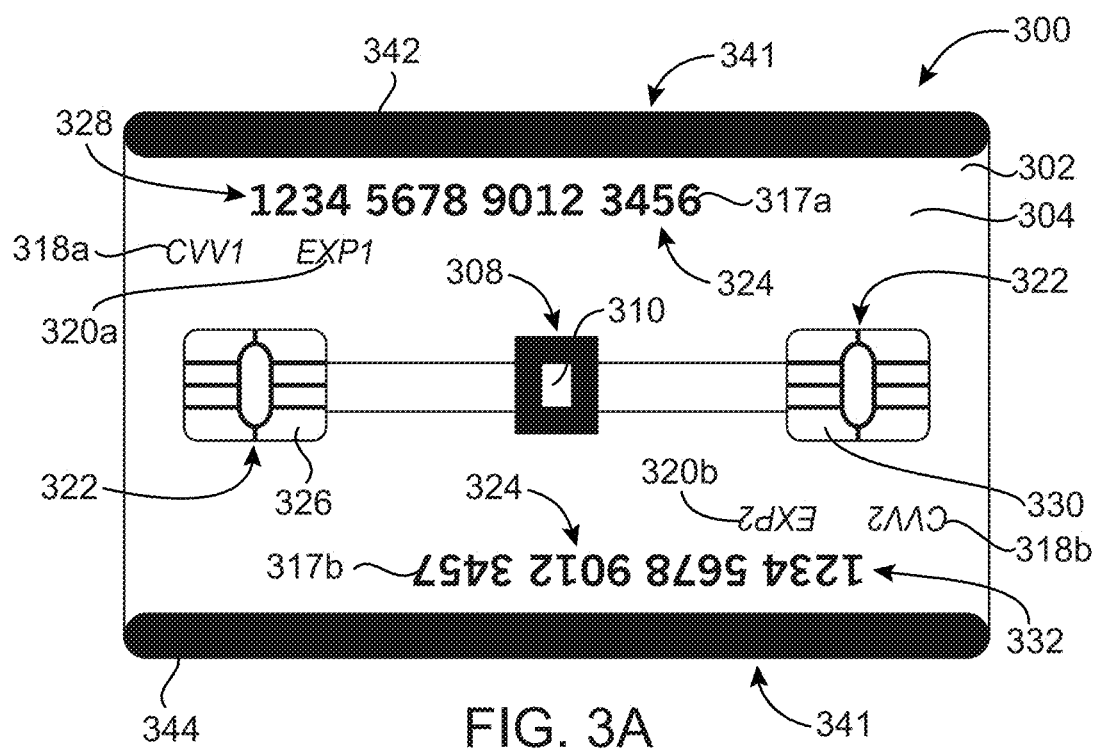
FIG. 3A is a front view of another embodiment of a payment device.
Figure 3B:
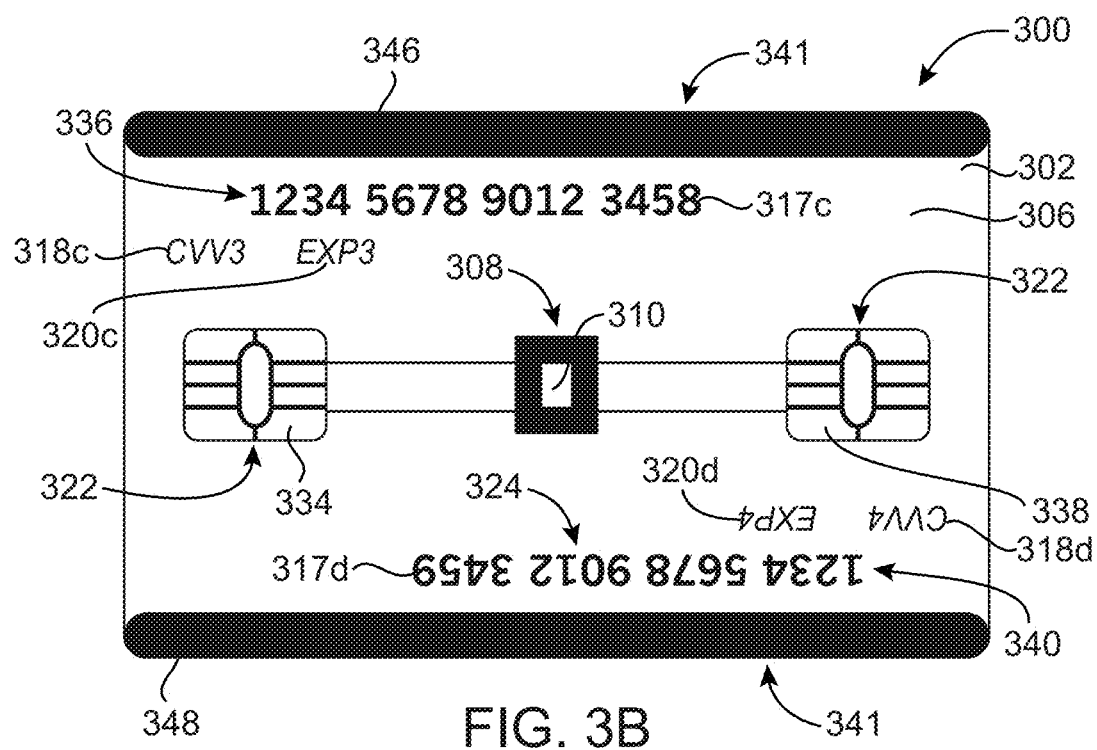
FIG. 3B is a rear view of the payment device of FIG. 3A.

FIGS. 3A and 3B illustrate another embodiment of a payment device 300. The payment device 300 may be similar to the payment device 200 and like components are indicated by similar reference numbers and have similar characteristics and properties as those discussed above. Similar to the payment device 200, the payment device 300 may include multiple connectors 322 and magnetic stripes 341, each of which may be associated with a payment account 324. However, unlike the payment device 200, the payment device 300 may have a single, master programmable chip 308, rather than four separate programmable chips. The master programmable chip 308 may be electronically connected to and in communication with one or more of the connectors 322. The master programmable chip 308 may include logic or instructions that drives each of the connectors 322 and determines which payment account 324 should be used for a transaction initiated by a user. The master programmable chip 308 may also be read and rewritten with new data.

As shown in the illustrative examples of FIGS. 3A and 3B, the payment device 300 may include a single master programmable chip 310, four connectors 326, 330, 334, 338, and four magnetic stripes 342, 344, 346, 348. More specifically, the master programmable chip 310 may be electronically connected to and in communication with the first connector 326, second connector 330, third connector 334, and fourth connector 338. Additionally, the first connector 326 and first magnetic stripe 342 may be associated with a first payment account 328, which may have an account number 317a. The second connector 330 and second magnetic stripe 344 may be associated with a second payment account 332, which may be have an account number 317b. The third connector 334 and third magnetic stripe 346 may be associated with a third payment account 336, which may be have an account number 317c. And, the fourth connector 338 and the fourth magnetic stripe 348 may be associated with a fourth payment account 340, which may be have an account number 317d. In addition, a CVV 318 and an expiration date 320 may be associated with each of the connectors 322, magnetic stripes 341, and/or payment accounts 324, where each of the CVV's 318 and expiration dates 220 may be the same or different from one another.

Figure 4:
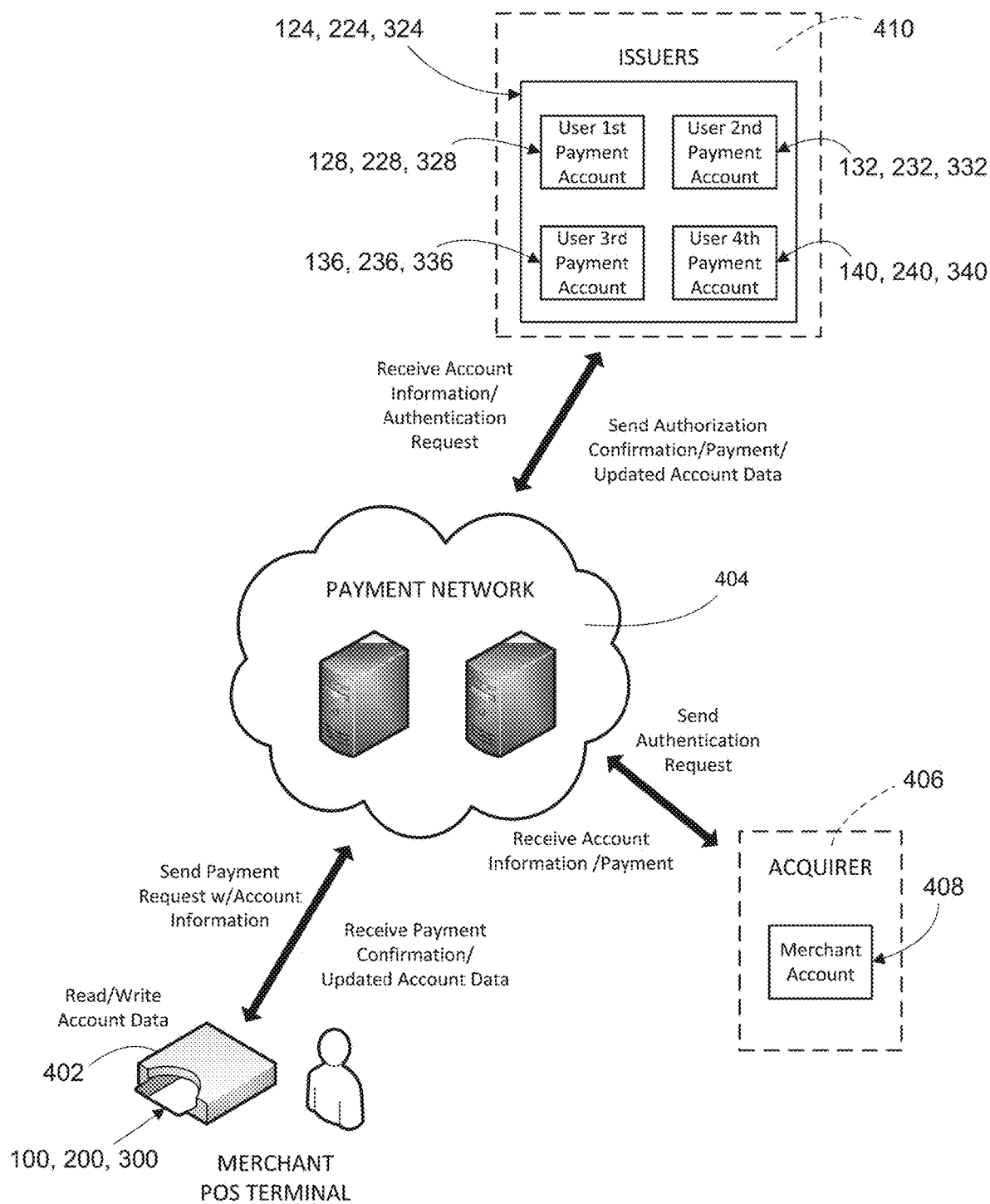
FIG. 4 is a diagram of payment transaction system in which any of the payment devices of FIGS. 1A-3B may be used.

FIG. 4 illustrates at a high-level a payment transaction system 400. The payment transaction system 400 may be spread out over a plurality of servers, databases, and/or processors that are part of a network or part of a cloud computing environment. The requests may be created and implemented in a language such as JavaScript or JQuery or any other appropriate computer language.

In one embodiment, the payment transaction system may include: a merchant point of sale (POS) terminal 402, which may be a contact or contactless chip-compatible read/write reader; a payment network 404; an acquirer 406 associated with a merchant account 408; and one or more issuers 410 associated with one or more payment accounts 124, 224, 324. The payment network 404, the acquirer 406, and the issuers 410 may each comprise one or more servers, databases, processors, storage devices such as a memory, and/or modules to process and store data, reports, and/or communicate various requests as discussed in more detail below.

A user wishing to make a transaction with the payment device 100, 200, 300, at a merchant would select the payment account 118, 218, 318 to be used by dipping or scanning the connector 122, 222, 322 associated with the selected payment account 124, 224, 324 at a reader such as merchant POS terminal 402. The merchant POS terminal 402 may then communicate with the programmable chip 108, 208, 308 associated with the connector 122, 222, 322. For the payment devices 100 and 200, once the connector 122, 222, 322 is in communication with the merchant POS terminal 402, the programmable chip 108, 208, 308 associated with the selected payment account may transmit payment account information, such as the account number 117, 217, 317, CVV 118, 218, 318, and expiration date 120, 220, 320, to the merchant POS terminal 402. For the payment device 300, the master programmable chip 308 would determine which account information to transmit to the merchant POS terminal 402 based on the connector that is used. The user may also be prompted to enter a PIN or provide a signature on the merchant POS terminal 402 as part of the transaction process.

Once the payment account information is received by the merchant POS terminal 402, the POS terminal 402 may send a payment request that includes the payment account information to the acquirer 406 via the payment network 404. The acquirer 406 may then send the payment request with the payment account information and an authentication request to the issuer 410 of the payment device 100, 200, 300 via the payment network 404.

The issuer 410 may verify or authenticate the account information received and may send a verification or authorization confirmation along with payment to the payment network 404. The payment network 404 may send the payment to the merchant account 408 via the acquirer 406 and may send the authorization confirmation or a payment confirmation via the payment network 404 to the merchant POS terminal 402 to indicate that the transaction has been completed.

In addition to processing a transaction, the merchant POS terminal 402 may be used to update account information stored on the programmable chip. For example, if the user wishes to make a transaction and the programmable chip is near or at expiration, the issuer may send updated account data, such as a new expiration date, credit limit, PIN, etc., to the POS terminal via the payment network. The POS terminal may then write the new account data onto the programmable chip.

The payment devices, readers, computers, and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner and may communicate with any other device via one or more networks.

The example embodiments may include additional devices and networks beyond those shown. The functionality described as being performed by one device may be distributed and performed by two or more devices. Multiple devices may also be combined into a single device, which may perform the functionality of the combined devices. Further, any of the elements in the above-described figures, including any payment devices, readers, or servers, may use any suitable number of subsystems to facilitate the functions described herein.

Any of the software components or functions described in this application may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A payment device comprising:
a medium;
a first programmable chip disposed on the medium;
a first magnetic stripe disposed on the medium, wherein the first programmable chip and the first magnetic stripe are associated with a first payment account;
a second programmable chip disposed on the medium;
a second magnetic stripe disposed on the medium, wherein the second programmable chip and the second magnetic stripe are associated with a second payment account,
wherein the first and second programmable chips are programmed separately for each of the first and second payment accounts; and
a third programmable chip disposed on the medium, the third programmable chip communicating a fraud notification when the third programmable chip is used in a payment transaction with a merchant.

2. The payment device of claim 1, further comprising:
a fourth programmable chip disposed on the medium; and
a fourth magnetic stripe disposed on the medium, wherein the fourth programmable chip and the fourth magnetic stripe are associated with a third payment account.

3. The payment device of claim 2, wherein the first, second, and third payment accounts each have a different expiration date.

4. The payment device of claim 2, wherein the first, second, and fourth programmable chips are programmed separately for each of the first, second, and third payment accounts.

5. The payment device of claim 1, a third magnetic stripe disposed on the medium.

* * * * *